United States Patent [19]

Sano et al.

[11] Patent Number: 5,133,916
[45] Date of Patent: Jul. 28, 1992

[54] POLYVINYL ALCOHOL FIBER HAVING EXCELLENT RESISTANCE TO HOT WATER AND PROCESS FOR PRODUCING THE SAME

[75] Inventors: Hirofumi Sano, Kurashiki; Akitsugu Akiyama; Hiroshi Narukawa, both of Soja, all of Japan

[73] Assignee: Kuraray Co., Ltd., Kurashiki, Japan

[21] Appl. No.: 341,040

[22] Filed: Apr. 20, 1989

[30] Foreign Application Priority Data

Apr. 21, 1988 [JP] Japan .................. 63-99799

[51] Int. Cl.$^5$ ............... D01F 6/14; D01F 6/00; D01D 5/12; C08F 16/06
[52] U.S. Cl. ................... 264/185; 428/364; 525/56; 525/62; 264/210.8; 264/205
[58] Field of Search ............ 428/364; 525/62, 56; 264/185, 210.8, 205

[56] References Cited

U.S. PATENT DOCUMENTS

| | | | |
|---|---|---|---|
| 3,826,298 | 7/1974 | Tanaka et al. | 152/359 |
| 3,850,901 | 11/1974 | Tanaka et al. | 260/91.3 |
| 3,852,402 | 12/1974 | Tanaka et al. | 264/185 |
| 4,599,267 | 1/1985 | Kwon et al. | 428/364 |
| 4,603,083 | 12/1984 | Tanaka et al. | 428/364 |
| 4,612,157 | 9/1986 | Genba et al. | 264/185 |
| 4,765,937 | 8/1988 | Hyon et al. | 264/185 |
| 4,810,450 | 3/1989 | Schellekens et al. | 264/185 |
| 4,812,277 | 3/1989 | Mokveld et al. | 264/185 |

*Primary Examiner*—Paul R. Michl
*Assistant Examiner*—Patrick Niland
*Attorney, Agent, or Firm*—Kramer, Brufsky & Cifelli

[57] ABSTRACT

Provided are a polyvinyl alcohol fiber having a specific higher order structure, obtained by having the orientation and arrangement of molecular chains forming the fiber which comprises a crystalline region and an amorphous region lie in specific ranges to thereby making the fiber have a break-ing temperature in hot water of at least 125° C., or further at least 130° C. and be excellent in abrasion resistance, while maintaining the tenacity and the modulus of the fiber at high levels; and a process for producing the same.

3 Claims, No Drawings

POLYVINYL ALCOHOL FIBER HAVING EXCELLENT RESISTANCE TO HOT WATER AND PROCESS FOR PRODUCING THE SAME

BACKGROUND OF THE INVENTION

1. Field of the Invention

The present invention relates to a high-polymerization-degree polyvinyl alcohol fiber having high strength and high modulus, as well as high resistance to hot water, and particularly to a polyvinyl alcohol fiber suited for industrial uses requiring resistance to hot water at high temperatures and abrasion resistance and for use as a reinforcing member for composite materials.

2. Description of the Prior Art

Polyvinyl alcohol fiber is superior to polyamide, polyester and polyacrylonitrile fibers in tenacity and modulus and, therefore, has been used not only as an industrial fiber, which is its principal application, but also as a replacement for asbestos fiber such as cement reinforcing material and the like.

Recently, processes for obtaining a polyvinyl alcohol fiber having still higher tenacity and modulus, have been proposed, which employ a concept of gel spinning-super drawing. See, for example Japanese Patent Application Laid-Open Nos. 100710/1984, 130314/1984, 108711/1986 and the like. Although these processes give a polyvinyl alcohol fiber having high tenacity and high modulus, they cannot endow it with a high resistance to hot water, a property which is required in some end-uses.

In view of the foregoing, the present inventors have intensively studied to obtain a polyvinyl alcohol fiber having a high resistance to hot water while maintaining the high tenacity and high modulus. Since polyvinyl alcohol polymers are by nature hydrophilic, fibers obtained from these polymers have a problem in water resistance and have hence been subjected to insolubilization treatment such as acetalization. Recent high-tenacity polyvinyl alcohol fibers, with advanced molecular orientation in their amorphous region, which is susceptible to being affected by water, have secured a dimensional stability against water without being subjected to the above-mentioned insolubilizaiton treatment. However, they instantaneously break by dissolution in a hot water of for example 120° C., and thus are still unsatisfactory for such uses as reinforcement of shaped cement articles which are aged in an autoclave, and ropes which are apt to suffer frequent and vigorous abrasion. The present inventors have intensively studied the relationship between the above-mentioned properties and the higher order structure of a fiber; and, as a result, found that the above object can be achieved by a fiber which comprises a crystalline region and an amorphous region, in which the orientation and the arrangement of molecular chains constituting it are in specific ranges. For example, there is in accordance with the present invention provided a fiber having a breaking temperature in hot water of at least 125° C., while maintaining a tenacity of at least 17 g/d and a modulus of at least 450 g/d. It was further found that such fiber can be obtained by a novel process which comprises spinning and drawing a polyvinyl alcohol polymer having an average polymerization degree obtained from the intrinsic viscosity of at least 3,000, the drawing process comprising a wet drawing of at least 3 times, then shrinking the thus drawn fiber by at least 2% to thereby relax the arrangement of the molecular chains, and further heat-drawing the fiber at a high temperature to promote rearrangement of the molecule.

SUMMARY OF THE INVENTION

Thus, the present invention provides a polyvinyl alcohol fiber having an excellent resistance to hot water, which has a breaking temperature in hot water of at least 125° C. as well as satisfies the following conditions for the higher order structure:

(a) the degree of crystallization, Xc, obtained from X-ray diffraction is at least 70%, (b) the molecular orientation factor, $\alpha$, determined by the sonic velocity method is in the range of from 0.91 to 0.95, (c) the crystal size in the fiber axis direction, $D_{(020)}$, obtained from X-ray diffraction is at least 130 angstrom, (d) the ratio of the crystal size in the fiber axis direction to that in the radial direction, $D_{(200)}/D_{(100)}$, obtained from X-ray diffraction is at least 2.0, (e) the melting temperature of crystal, Tm, determined by thermal analysis is at least 240° C., and (f) the difference, $\Delta T$, between the above melting temperature and the initial melting temperature of crystal is not more than 25° C.

The present invention also provides a process for producing the above fiber, which is excellent in resistance to hot water, comprising the steps of:

(i) dissolving a polyvinyl alcohol polymer having an average polymerization degree obtained from the intrinsic viscosity of at least 3,000 in a solvent to prepare a dope solution, (ii) spinning the solution to form filaments in the usual way, (iii) wet drawing the filaments thus spun containing the solvent in a drawing ratio of at least 3 times, (iv) partially or completely removing the solvent using an extracting agent, (v) drying the filaments at a temperature not higher than 140° C. to remove the remaining solvent and the extracting agent while shrinking the filaments by 2 to 30%, and then (vi) heat drawing the filaments at a temperature of 220 to 260° C. to a total drawing ratio of at least 17 times.

DETAILED DESCRIPTION OF THE PREFERRED EMBODIMENTS

Generally in the production of a polyvinyl alcohol fiber, for the purpose of obtaining a high-tenacity, high-modulus fiber there is known a process comprising: using as starting material a polyvinyl alcohol having a high polymerization degree; preparing a spinning dope with an organic solvent, which is advantageous for a development of a homogeneous cross-sectional structure; extruding the solution through a spinneret into filaments; and drawing the filaments thus spun in as high a temperature and drawing ratio as possible to thereby promoting the orientation and crystallization. However, for the purpose of obtaining a high-tenacity, high-modulus fiber exhibiting excellent resistance to hot water, the fiber must have a higher order structure comprising an amorphous region and crystalline region as described below:

(1) has a proper orientation of molecular chains in the fiber axis direction, (2) has a high ratio of crystalline region having crystals more closely approaching perfect the crystal, and (3) has crystals which, to the extent possible, have grown slender in the direction of the fiber axis.

The requirements as regards to what extent the above higher order structure must be controlled can be expressed in terms of representative parameters. First, the orientation of molecular chains in the fiber, though generally expressed in terms of birefringence measured with a polarizing microscope, is in the present invention expressed by a molecular orientation factor, $\alpha$, obtained by measurement of sonic velocity. The conventional birefringence method is difficult to apply hereto, because a high-tenacity, high-modulus fiber as obtained according to the present invention is very fine and hence often whitened. Moreover the measurement itself is difficult and tends to produce error in the case where the cross section of the fiber is not round. The measurement of sonic velocity on the other hand is easy to conduct nd produces little error, and further has a clear theoretical background. The fiber of the present invention must have a proper molecular orientation factor, $\alpha$, the preferred range thereof being from 0.91 to 0.95. With $\alpha$ of less than 0.91, the molecular orientation is not sufficient, whereby both the tenacity and the modulus are low and further the hot water resistance will not exhibit the desired level. If $\alpha$ exceeds 0.95, the fiber will suffer a severe fibrillation and hence become fragile, and show a serious drop in the tenacity or cause fibrillation by scraping when twisted into a cord, and a s such cannot be put in practical use for cords, ropes and the like, even though it shows a high tenacity and a high modulus in a state of a single filament or as a multifilament yarn.

Next, the ratio of crystalline region is generally and in the present invention expressed in terms of a crystallization degree, Xc, obtained by wide-angle X-ray diffraction. While the crystallization degree of a fiber can also be calculated from its density, this method is not applicable to the fiber of the present invention, since the fiber is often whitened and generates voids. The fiber of the present invention must have a crystallization degree, Xc, as measured by X-ray diffraction method, of at least 70%, and preferably in the range of from 75 to 85%. With Xc of less than 70%, the fiber will not exhibit the desired hot water resistance and has a poor dimensional stability and a low abrasion resistance; while if it exceeds 85%, the fiber will generally become fragile, and not be of practical value for use in cords or ropes in view of strength utilization ratio (yarn-to-cord strength ratio) and abrasion resistance.

Perfectness of crystal is another important factor, besides the afore-mentioned orientation of molecular chains, for achieving a desirable hot water resistance. This is expressed in terms of the melting temperature and the initial melting temperature of the crystal melting curve. The fiber, having been subjected to wet drawing, and shrinking, followed by heat drawing according to the present invention, has not only an elevated melting peak temperature but a greater content of crystals melting at high temperatures, and hence has an improved resistance to hot water. In the present invention, it is necessary that the melting temperature. Tm, as indicated in terms of the peak temperature be at least 240° C. and at the same time the difference, $\Delta T$, between the melting temperature and the initial melting temperature of crystals obtained from the point at which the low-temperature-side slope of the melting curve contacts the base line be not higher than 25° C.; and unless these two conditions are satisfied the desired hot water resistance can never be acquired.

It is also necessary that in the fiber of the present invention the direction of crystal growth be controlled such that the crystal size in the axial direction, $D_{(200)}$, measured by X-ray diffraction be at least 130 angstroms, and the ratio of crystal size in the axial direction to that in the radial direction, $D_{(200)}/D_{(100)}$, be at least 2.0. Unless the above conditions are satisfied, the desired high-tenacity, high-modulus fiber having an excellent resistance to hot water cannot e obtained.

The novel polyvinyl alcohol fiber having the above-mentioned, controlled, properties can be produced according to the following novel process. The polyvinyl alcohol used in the present invention has an average polymerization degree determined from the intrinsic viscosity of the aqueous solution at 30° C. of at least 3,000, preferably at least 5,000, ; more preferably at least 7,000 and a saponification degree of at least 98 mol%, and is preferably a linear polyvinyl alcohol with a low degree of branching. Further the polyvinyl alcohol may be a copolymer copolymerized with other vinyl monomers in an amount of not more than 2 mol%, and also may contain in the total amount of not more than 3% by weight of additives such as boric acid, an antioxidant, ultraviolet absorber, etc. Particularly, polyvinyl alcohol with a higher degree of polymerization generally provides a high-tenacity, high-modulus fiber with a greater improvement in resistance to hot water, since such polyvinyl alcohol has a smaller number of molecular ends which cause a defect and has a larger number of tie molecules connecting crystals adjacent to each other, thereby yielding a denser structure. On a commercial scale, a polymerization degree of 5,000 ; to 20,000 is preferred. Addition of boric acid or a borate in an amount of 0.2 to 3.0% by weight of the polymer is effective in increasing the spinnability and in preventing degradation at heat drawing stage.

Examples of the solvent used in the present invention for dissolving polyvinyl alcohol include, among others, polyhydric alcohols such as ethylene glycol, trimethylene glycol, diethylene glycol and glycerine; dimethyl sulfoxide; dimethyformamide; diethylenetriamine; water and mixtures of two or more of the foregoing; or aqueous solutions of thiocyanates. Any of the above can be used but, particularly preferred among them are dimethyl sulfoxide and a mixed solvent of dimethyl sulfoxide with water, for obtaining a transparent and homogeneous gel-state fiber which can readily be drawn.

Any conventional process, e.g. dry spinning, wet spinning or dry-jet-wet spinning may be employed in the present invention for extruding the polyvinyl alcohol dope solution through a nozzle into fiber but, for obtaining a fiber having excellent resistance to hot water aimed at by the present invention, it is preferred to use, rather than dry spinning process which employs a high concentration dope, wet spinning or dry-jet-wet spinning which performs spinning from a dope having a lower concentration, of which two dry-jet-wet spinning is most preferred since it can readily give a transparent, homogeneous gel fiber by rapid cooling. The dope solution preferably has a concentration, depending on the average polymerization degree of the polymer, of 5 to 15% by weight for an average polymerization degree of 5,000 and 3 to 10% by weight for an average polymerization of 10,000. In a wet spinning or a dry-jet-wet spinning where an air gap is secured between the nozzle and a first bath, the shape and structure of the obtained fiber will vary depending on the combination of the solvent for dope, employed the composition of the first bath and the temperatures thereof. Generally, where a liquid having a strong coagulating capability is employed for the first bath, the obtained fiber has a skin-core structure, thus exhibiting different densities of the inner and outer layers. Where on the other hand a liquid having a mild coagulation and extraction capability such as low-temperature methanol or mixtures of methanol and other organic solvents is used for the first bath, there is obtained a fiber having coagulated into a relatively homogeneous gel. A still more homogeneous, transparent and dense fiber is obtained when there is employed a gel spinning which gels the extruded dope by lowering the temperature after the extrusion, followed by slow extraction. This gel-spinning process therefore is preferred in the present invention. For the first bath, there can be used alcohols such as methanol, ethanol and n-propanol, and mixtures of an alcohol with an organic solvent, aqueous akaline solutions and aqueous solutions of an inorganic salt such as sodium sulfate, and the like. The temperature of the first bath should be not higher than 30° C., preferably not higher than 10° C.

The process of the present invention includes passing the fiber through the first bath, and then, while the fiber still contains some solvent, wet drawing the fiber and simultaneously extracting the solvent in a second and succeeding baths. The wet drawing must be conducted at a temperature lower than 90° C. in a ratio of at least 3, preferably at least 5, the amount of the solvent then contained being, though dependent on the wet drawing temperature, preferably at least 10% by weight based on the polyvinyl alcohol. The wet drawing is assumed to have functions of, to some extent, the orientation of the fiber prior to the heat drawing process and destroying microcrystals formed at the coagulation stage to thereby promote the action of the hat drawing. The wet drawing further has a function of extracting the solvent, minimizing inter-filament adhesion, or sticking between single filaments, and thus passing the fiber through the bath of an alcohol, an aqueous solution of an inorganic salt or the like to a final content of the residual solvent of not more than 5% by weight, followed by passage to the succeeding drying process.

The process of the present invention is further characterized by having the fiber shrink by at least 2%, preferably 5 to 25% during the drying process this treating temperature is preferably not higher than 140° C. The shrinkage which occurs during the drying process before the heat drawing process causes the molecular chains of the fiber oriented at the wet drawing process to relax somewhat and to undo their entanglement, thereby increasing the drawing ratio at the succeeding heat drawing process, which will promote the orientation and crystallization of the molecules. The shrinking process is thus essential for producing the desired high-tenacity, high modulus fiber with high resistance to hot water, having a higher order structure. If the shrinkage ratio is less than 2%, the relaxation of the molecular chains will not be sufficient and the total drawing ratio cannot be increased. On the other hand if a shrinkage exceeding 30% occurs, the molecular orientation established in the wet drawing process will be greatly disturbed and, though apparent total drawing ratio can be increased, the molecular orientation factor required for the achievement of desired hot water resistance will decrease. Further, if the drying is conducted at a temperature exceeding 140° C., crystallization will readily occur to disturb the succeeding heat drawing, whereby the desired fiber having a higher order structure is difficult to obtain. The shrinkage process has a further function of helping remove the solvent and the extracting agent and minimize the sticking between single filaments to thereby suppress fibrillation of the fiber at the drawing process.

In the process of the present invention, heat drawing is conducted after the above during process in a hot gas or a heated oil bath at a temperature of not lower than 220° C., with a single stage or a multi-stage process, to a total drawing ratio of at least 17, preferably at least 19. The preferred heat drawing temperature is 230° to 260° C. If it is lower than 220° C., the orientation of molecular chains and the growth and arrangement of the crystals will not be sufficient. If on the other hand it is higher than 260° C., the crystals will partially melt, thereby impairing the effect of heat drawing. Further, at temperatures higher than 260° C., the polyvinyl alcohol itself will partly be degraded, causing the fiber to color and decrease in the tenacity. If the total drawing ratio is less than 17, the effect of the drawing will often be insufficient, thus being incapable of satisfying the parameters of the higher order structure of fiber required for giving the fiber a sufficient hot water resistance, abrasion resistance and the like as described later herein. Where the heat drawing is conducted in a dry heating system such as hot air circulation oven or infrared heating oven, it is preferred for the purpose of preventing degradation of the polymer or sticking of filaments to apply a finishing oil to the fiber beforehand or to conduct the drawing in an inert atmosphere. If the orientation of molecular chains is thought to proceed in the heat drawing stage too far for some end-uses of the obtained fiber, a heat treatment may, as required, be conducted after the heat drawing, at a temperature a little higher than the heat drawing temperature causing the drawn fiber again to shrink a little by 0 to 5%, thereby adjusting the fiber to one having a desired higher order structure.

The above-described process for producing a polyvinyl alcohol fiber can give an excellent fiber having a breaking temperature in hot water of at least 125° C. and maintaining a high level of for example at least 17 g/d and at least 450 g/d in the tenacity and the modulus, respectively.

In particular, the present invention can, by using a polyvinyl alcohol having an average polymerization degree by intrinsic viscosity of at least 5,000 and by employing the above-described production process of the present invention, realize a crystallization degree, Xc, of at least 75%, a crystal melting temperature, Tm, of crystal of at least 245° C. and a difference, $\Delta T$, between the crystal melting temperature and the initial melting temperature of crystal of not higher than 20° C., whereby the obtained fiber has an extremely excellent resistance to hot water, its breaking temperature in hot water being at least 130° C.

Further, when in the present invention a still higher tenacity and modulus is desired, a drawing with a still higher drawing ratio is conducted in the process of the present invention, to make the crystal size in the axial direction, $D_{(020)}$, at least 140 angstroms, and the ratio, $D_{(020)}/D_{(100)}$, of the $D_{(020)}$ to the crystal size in the radial direction $D_{(100)}$, at least 2.2, whereby the desired fiber can be obtained. It will further be understood that a fiber having both a still higher tenacity and a higher resistance to hot water can in the present invention be obtained by conducting the above-described high drawing while employing a polyvinyl alcohol having an average polymerization degree by intrinsic weight of at least 5,000.

With respect to the hot water resistance, it is necessary for a polyvinyl alcohol fiber, for the purpose of countering the conventional idea about polyvinyl alcohol fiber and coping with so-called super fibers such as aramide fibers and arylate fibers, to have a hot water resistance of at least 125° C., preferably at least 130° C. Polyvinyl alcohol fibers have been used for example for the reinforcement of cement products such as slate, replacing asbestos, but only for those products which are aged at room temperature and not for ones aged for example at 80° to 150° C. for 0.5 to 24 hours in an autoclave. For reinforcing such high-performance cement products to be aged in severe conditions, only the polyvinyl alcohol fiber according to the present invention, having a breaking temperature in hot water of at least 125° C. can be used. Aramide fibers and arylate fibers are, though being superior in hot water resistance, short of hydrophilic property and readily pulled out upon breakage of the cement product they reinforce, thus exhibiting only a small reinforcing effect. It is therefore reasonable to say that the replacement of asbestos in the field of autoclave-aged cement products has become possible first with the fiber of the present invention.

As described heretofore, the polyvinyl alcohol fiber in which the higher order structure comprising amorphous and crystalline regions is controlled has a high yarn tenacity of at least 17 g/d and a high tensile modulus of at least 450 g/d, as well as a breaking temperature in hot water of at least 125° C. together with an improved abrasion resistance; and these high-performance characteristics have first been achieved by the novel process according to the present invention, which comprises wet drawing an extruded fiber, and having it shrink a little in the drying stage, followed by heat drawing. It is expected that the fiber will be used for, in addition to conventional industrial end-uses such as ropes and canvases, and replacement of asbestos for reinforcing cement or the like, novel end-uses including tire cords, reinforcing members for high-temperature, high-pressure hoses, for FRP, and for autoclave-aged cement products, and the like.

Other features of the invention will become apparent in the course of the following descriptions of exemplary embodiments which are given for illustration of the invention and are not intended to be limiting thereof.

EXAMPLES

Various properties and parameters in the Examples are those measured according to the following methods.

1) Average polymerization degree by intrinisic viscosity of polyvinyl alcohol, $\bar{P}$ JIS K6726 was applied and $\bar{P}$ was calculated from the intrinsic viscosity [η], measured on the aqueous solution at 30° C. by $$\log \bar{P} = 1.63 \log ([\eta] \times 10^4/8.29)$$

2) Tensile tenacity, elongation at break and elastic modulus JIS L1013 was applied, A specimen of yarn previously conditioned was tested at a gauge length of 20 cm, initial load of 0.25 g/d and a rate of extension of 100%/min for the breaking load, elongation at break and initial modulus. An average of test results on at least five specimens was reported. The fineness, in deniers, of a specimen was measured by gravity method.

3) Hot water resistance

A bundle of 25 filaments loaded at 2 mg/denier was hung in the middle of a sealed cylindrical glass autoclave immersed in water. The water was heated at a constant rate of temperature elevation of 1.5° C./min until the bundle broke. The temperature at break was reported.

4) Abrasion resistance

A yarn specimen having a fineness of 1500 deniers was twisted at 80 turns/m into a cord. 1.3 meters of the cord was rounded into a loop. The loop was mounted on a pair of pulleys in 8-shape with 1.5 twisting in the center. The yarn of the loop was subjected to fiber to fiber abrasion at a load of 0.7 g/dr with reciprocal rotation of the pulleys. The number of reciprocal rotations when the yarn broke was recorded.

5) Thermal analysis

Differential scanning calorimetry was conducted using Type DSC-b 2C available from Perkin-Elmer Ltd. in nitrogen gas atmosphere at a temperature elevation rate of 10° C./min starting from room temperature up to 280° C. The peak of endotherm of crystal melting was taken as the melting temperature, Tm, and the point at which the low-temperature side of the slope of the peak contacts the baseline was taken as the initial melting temperature of crystal, $T_1$. The difference, $\Delta T = Tm - T_1$, was calculated from the two.

6) Molecular orientation factor, α, determined by sonic velocity measurement.

A direct reading pulse propagation viscoelastometer, DDV-5B made by Orientec Ltd. was used and the velocity, C, of the sonic wave of 10 KHz along the fiber axis was measured. Separately, the sonic velocity, Cu, in an unoriented cast film of the polyvinyl alcohol was measured to give 2.20 km/sec. The molecular orientation factor, α, was calculated from Moseley's formula below $$\alpha = 1 - Cu^2/C^2$$

7) X-ray diffraction

A wide-angle X-ray diffractometer, RAD-γC with a light source of CuK Δ-ray of 40 kv and 100 mA, and a graphite monochrometer and scintillation counter were used. The crystallization degree, Xc, was measured using a slit system of DS: 2 mm≧, SSJ: 0.5 degree and RS: 0.15 mm at a scanning speed of 1.0 degree/min for the range of 2θ=5 to 35 degrees. The crystal size was measured with a slit system of DS: 0.5 degree, SS: 0.5 degree and RS: 0.15 mm at a scanning speed of 0.5 degree/min. Then, the crystal sizes, $D_{(020)}$ and $D_{(100)}$, were calculated from the half-widths, B(hkl), of peaks at Miller's indexes (020) and (100) by Scherrer's formula below.

$$D(hkl) = K\lambda/Bo(hkl)\cos\theta(hkl)$$

wherein D=0.9, λ=1.5418 angstroms, Bo is the range in radians of diffraction curve by Jones' method after the slit has been corrected, and θ (hkl) is Bragg's angle (degrees).

EXAMPLES 1 AND 2 AND COMPARATIVE EXAMPLE 1

Two completely saponified polyvinyl alcohols, one having an average polymerization degree by intrinsic viscosity of 7.000 (Example 1 and Comparative Example 1) and the other 16,000 (Example 2), were separately mixed with glycerine in amounts of 9% by weight and 6% by weight respectively and dissolved at 180° C. The solutions were each extruded through a nozzle with 40 holes each having a diameter of 0.15 mm down into a first bath provided 25 mm below the nozzle. The first bath had a composition by weight of methanol/glycerine=6/4 and the temperature was kept at 15° C. At this stage, nearly true-circular, transparent, gel-like fibers were obtained. The contents of the remaining solvent in the fibers leaving the first bath and before entering the second bath were 29% by weight in Example 1 and 51% by weight in Example 2. These fibers were each wet-drawn by 5 times in the second bath comprising methanol, whereafter the residual solvent was almost completely replaced with methanol in the next methanol bath. Thereafter, the methanol was removed by drying with a hot air at 80° C. while being shrunk by 9%. The fibers thus obtained each had a round, homogeneous cross section with no sticking together of filaments. A fiber was produced in Comparative Example 1 in the same manner as in Example 1 except that the drying was conducted without causing the fiber to shrink, i.e. at a constant length. The obtained fiber showed a little sticking between filaments. The crystallization degrees, $Xc$, obtained from the X-ray diffraction of the transparent fibers having been wet-drawn in Examples 1 and 2 were smaller than those of the fibers before the drawing by as much as 5 to 10%, showing that the wet drawing had destroyed the microcrystals once formed in the coagulation process to thereby facilitate the succeeding heat drawing. The wet-drawn fibers were each one-stage heat drawn in a 240° C. hot air circulating oven. The total drawing ratio, which was selected to be a little lower than the maximum drawing ratio (the ratio at which the yarn breaks) and such that the continuous drawing operation is stably conducted, was 20.5 in Example 1 and 19.8 in Example 2, while it was 17.8 in Comparative Example 1 in which the shrinkage was not conducted at drying.

The yarn properties and the hot water resistances of the drawn yarns thus prepared are summarized in Table 1, and their higher order structures measured by the aforedescribed methods are summarized in Table 2. In Examples 1 and 2, where shrinkage was conducted at drying, all the conditions for the higher order structures required for the fiber aimed at by the present invention were satisfied, and both the yarn tenacity and modulus were high, the hot water resistance were as high as at least 125° C., and the breaking strokes in the abrasion resistance test were 7,200 and 9,800 respectively, proving their abrasion resistance to be superior to that in Comparative Example hereinafter described. In Comparative Example 1, although $Sc$ and $Tm$ satisfy the requirements, other structural parameters did not, and both the tenacity and modulus are low and the desired hot water resistance of at least 125° C. was not obtained.

Further, the fiber had a low abrasion resistance of 3,100 strokes perhaps because of poor dimensional stability caused by immature orientation and crystallization as indicated by its low crystal melting temperature.

EXAMPLE 3

A completely saponified polyvinyl alcohol having an average polymerization degree obtained from the intrinsic viscosity of 4,700 was mixed in dimethyl sulfoxide in an amount of 8% by weight, and at the same time 0.5% by weight based on the polymer of boric acid was added. The mixture was stirred at 90° C. to dissolve. The solution thus prepared was extruded through a nozzle to form a bundle of filaments with 20 holes each having a diameter of 0.12 mm down into a first bath provided 20 mm below the nozzle. The first bath had a composition by weight of methanol/dimethyl sulfoxide=8/2 and the bath temperature was dept at 8° C. The transparent, gel-like filaments thus obtained and still containing the solvent were wet-drawn by 4.5 times in a methanol bath at 40° C. then had the residual solvent almost completely extracted off in the next methanol bath, and thereafter were dried in a 100° C. hot air while being shrunk by 15%. The filaments thus obtained had a residual boric acid content of 0.17% by weight and a residual solvent content of 0.6% by weight. Then, the filaments were two-stage heat drawn to a total drawing ratio of 19.7 in hot air circulating ovens of 190° C. and 235° C. respectively to yield a drawn fiber. The properties and the higher order structural parameters of the obtained fiber are shown in Table 1 and Table 2 respectively. It is apparent from the Tables that all the conditions for the higher order structure required for the fiber aimed at by present invention were satisfied and both the yarn tenacity and modulus were high, and an excellent hot water resistance of at least 125° C. was obtained.

COMPARATIVE EXAMPLE 2

A polyvinyl alcohol fiber which is said to have the highest tenacity among commercially available polyvinyl alcohol fibers was subjected to the same measurements for the properties and the higher order structures as in Examples. The fiber was estimated to have been produced from a dope having utilized a water-related solvent. The measurement results are shown in Table 1 and Table 2. The tensile tenacity and the modulus were far inferior to those in the Examples according to the present invention, and with respect to the hot water resistance this sample broke at a considerably low temperature. The higher order structural parameters did not, though some were marginal, satisfy all the requirements for the fiber of the present invention. In particular, the parameters related to the perfectness of crystal as obtained from the crystal size ratio or by thermal analysis were found to be out of the specified ranges.

Obviously, numerous modifications and variations of the present invention are possible in light of the above teachings. It is therefore to be understood that within the scope of the appended claims, the invention may be practiced otherwise than as specifically described herein.

TABLE 1

| No. | Polymerization degree | Solvent | Wet drawing ratio (times) | Shrinkage at drying (%) | Total drawing ratio (times) | Yarn properties | | | Breaking temperature in hot water (°C.) |
|---|---|---|---|---|---|---|---|---|---|
| | | | | | | denier | tenacity (g/d) | modulus (g/d) | |
| Ex. 1 | 7000 | glycerine | 5.0 | 9.0 | 20.5 | 126 | 19.0 | 490 | 132 |
| Ex. 2 | 16000 | glycerine | 5.0 | 9.0 | 19.8 | 114 | 21.3 | 548 | 138 |
| Comp. Ex. 1 | 7000 | glycerine | 5.0 | 0 | 17.8 | 149 | 16.7 | 441 | 123 |
| Ex. 3 | 4700 | dimethyl sulfoxide | 4.5 | 15 | 19.7 | 105 | 18.5 | 533 | 136 |
| Comp. Ex. 2 | Commercial high-tenacity polyvinyl alcohol fiber | | | | | — | 11.5 | 256 | 119 |

TABLE 2

| No. | X-ray diffraction | | | sonic modulus | thermal analysis | |
|---|---|---|---|---|---|---|
| | degree of crystallization $X_c$ (%) | crystal size $D_{(020)}$ (Å) | ratio of crystal sizes $D_{(020)}/D_{(100)}$ | molecular orientation factor $\alpha$ | melting temperature $T_m$ (°C.) | temperature difference $\Delta T$ (°C.) |
| Example 1 | 78 | 147 | 2.32 | 0.92 | 248 | 20 |
| Example 2 | 76 | 152 | 2.41 | 0.93 | 251 | 18 |
| Comparative Example 1 | 71 | 128 | 1.93 | 0.90 | 246 | 31 |
| Example 3 | 74 | 138 | 2.18 | 0.92 | 248 | 22 |
| Comparative Example 2 | 69 | 132 | 1.96 | 0.91 | 241 | 31 |

What is claimed is:

1. A polyvinyl alcohol fiber having a tenacity of at least 18.5 g/d, a tensile modulus of at least 490 g/d, and a breaking temperature in hot water of at least 130° C. comprising a polyvinyl alcohol having an average degree of polymerization obtained from the intrinsic viscosity of from about 5000 to 20,000, said fiber having been heat drawn to a total draw ratio of at least 18 at a temperature ranging from 230° to 260° C., and satisfying the following conditions for a highly ordered structure:
   (a) the crystallization degree, $X_c$, obtained by X-ray diffraction is at least 70%,
   (b) the molecular orientation factor, $\alpha$, obtained from the sonic velocity is 0.91 to 0.95,
   (c) the crystal size in the direction of the fiber axis, $D_{(020)}$, measured by X-ray diffraction is at least 130 angstroms,
   (d) the ratio of the crystal size in the direction of the fiber axis to that in the radial direction, $D_{(020)}/D_{(100)}$, measured by X-ray diffraction is at least 2.0,
   (e) the crystal melting temperature, $T_m$, obtained by thermal analysis is at least 240° C., and
   (f) the difference, $\Delta T$, between the initial crystal melting temperature and the crystal melting temperature obtained by thermal analysis is not more than 25° C.

2. A polyvinyl alcohol fiber according to claim 1, comprising a polyvinyl alcohol having an average polymerization degree obtained from the intrinsic viscosity of at least 5,000 and has a breaking temperature in hot water of at least 130° C., wherein the crystallization degree, $X_c$, obtained by X-ray diffraction method is 73 to 85%, the melting temperature of crystal, $T_m$, obtained by thermal analysis is at least 245° C., and the difference, $\Delta T$, between the initial melting temperature of crystal and the melting temperature of crystal is not more than 20° C.

3. A polyvinyl alcohol fiber according to claim 1 wherein the crystal size in the direction of the fiber axis, $D_{(020)}$ is at least 140 angstoms and the ratio of the crystal size in the direction of the fiber axis to that in the radial direction, $D_{(020)}/D_{(100)}$, is at least 2.2.

* * * * *